United States Patent [19]

Voirin

[11] Patent Number: 4,605,546

[45] Date of Patent: Aug. 12, 1986

[54] CATALYTIC PROCESS FOR THE PRODUCTION OF SULFUR FROM A GAS CONTAINING H$_2$S

[75] Inventor: Robert Voirin, Orthez, France

[73] Assignee: Societe Nationale Elf Aquitaine (Production), Courbevoie, France

[21] Appl. No.: 574,911

[22] Filed: Jan. 30, 1984

[30] Foreign Application Priority Data

Jan. 31, 1983 [FR] France ................. 83 01446

[51] Int. Cl.$^4$ ............ B01D 53/36; C01B 17/04
[52] U.S. Cl. ................. 423/576; 423/573 G; 423/574 R; 502/303; 502/338
[58] Field of Search .......... 423/573 G, 574 R, 574 G, 423/576

[56] References Cited

U.S. PATENT DOCUMENTS

| | | | |
|---|---|---|---|
| 3,702,884 | 11/1972 | Hunt, Jr. et al. | 423/574 G |
| 4,035,474 | 7/1977 | Kunkel et al. | 423/576 |
| 4,092,404 | 5/1978 | Hass | 423/573 G |
| 4,192,857 | 3/1980 | Tellier et al. | 423/576 |
| 4,197,277 | 4/1980 | Sugier et al. | 423/573 G |
| 4,399,112 | 8/1983 | Voirin | 423/244 |
| 4,406,873 | 9/1983 | Beavon | 423/576 |
| 4,426,369 | 1/1984 | Palm | 423/576 |

Primary Examiner—John Doll
Assistant Examiner—Jeffrey E. Russel
Attorney, Agent, or Firm—Burgess, Ryan & Wayne

[57] ABSTRACT

A catalytic process for the production of sulphur from an acid gas containing H$_2$S, in which a part of H$_2$S is catalytically oxidized in order to form an effluent containing H$_2$S and SO$_2$ in a molar ratio of 2:1 and a given quantity of sulphur, then said effluent is contacted with a CLAUS catalyst to form a further quantity of sulphur.

The catalytic oxidation of H$_2$S is carried out in the presence of an oxidation catalyst consisting of agglomerates comprising an active alumina thermally stabilized by at least one oxide from the group consisting of SiO$_2$, ZrO$_2$, the rare-earth metal oxides and the alkaline-earth metal oxides to which are associated one or more compounds of metals such as iron that promote the oxidation of H$_2$S.

21 Claims, No Drawings

CATALYTIC PROCESS FOR THE PRODUCTION OF SULFUR FROM A GAS CONTAINING H₂S

The invention relates to a catalytic process for the production of sulphur from a gas, called acid gas, containing $H_2S$ and more especially from an acid gas containing at the most 25% by volume $H_2S$.

BACKGROUND OF THE INVENTION

In known plants for the production of sulphur from a gas containing hydrogen sulphide, also known as "acid gas", this gas is caused to flow in a thermal reaction stage in which one third of the hydrogen sulphide is transformed into $SO_2$ in the presence of oxygen or air at a temperature at least equal to 900° C. The gaseous reaction mixture from the thermal reaction stage contains a certain quantity of sulphur as well as $H_2S$ and $SO_2$ in a $H_2S/SO_2$ molar ratio of 2/1. This gaseous mixture is subjected to indirect cooling allowing the recovery of calories contained therein, while producing steam, and the cooled mixture is caused to flow to a condensation stage in which the sulphur contained in the gaseous mixture is separated by condensation. In order to improve the sulphur production, which at this stage is still very incomplete, the gaseous mixture issuing from the condensation stage is reheated and then fed into one or more catalytic conversion stages comprising a suitable catalyst, called CLAUS catalyst, at the contact of which $SO_2$ reacts with $H_2S$ in order to form a fresh quantity of sulphur. The residual gases issuing from the final catalytic conversion stage are caused to flow to an incineration stage, the effluent of which are thereafter discarded in the atmosphere.

The use of a thermal reaction stage to oxidize into $SO_2$ the required quantity of $H_2S$ is only possible for $H_2S$ concentrations of acid gas higher than about 15 to 20% by volume. For values lower than that limit, it is not possible to maintain a sufficient flame temperature, i.e. in the range of 900° C. or more, to obtain a stable combustion without necessitating important modifications.

Furthermore, this high-temperature thermal reaction leads to a transformation of part of the sulphur produced into COS and $CS_2$ when the acid gas contains $CO_2$ and/or hydrocarbons. The formation of these organic sulphur compounds is bothersome in so far that they can only be transformed with difficulty into sulphur in the catalytic conversion stages, and this contributes consequently to the decrease of the overall sulphur conversion yield of a sulphur plant.

In order to overcome these drawbacks, resulting from the use of a thermal reaction stage for producing effluent containing $H_2S$ and $SO_2$ in a $H_2S/SO_2$ ratio of 2/1, German patent application No. 3,015,800 proposes replacing the thermal reaction stage of a sulphur plant with a catalytic oxidation stage using an oxidation catalyst based on a vanadium oxide or sulphide supported on a non-alkaline porous refractory matrix and operating at temperatures lower than 454° C. the said temperatures being controlled by recycling part of the gaseous effluent from the catalytic oxidation stage, after cooling of said effluent and condensation of the sulphur contained therein.

In such a process, the necessity of recycling part of the effluent of the catalytic oxidation stage for controlling the temperature of said stage causes a certain number of technological restrictions and leads especially to the use of quantities of catalyst in the oxidation stage, which are more important as the $H_2S$ concentration in the acid gas is high.

In French patent application No. 81 15900 filed on Aug. 19, 1981, description is made of a catalytic process for the production of sulphur from a gas containing $H_2S$, which is similar to the process disclosed in the German patent application referred to above but for the oxidation catalyst used which consists of a metal compound, more particularly an iron compound, associated to a porous carrier comprising a major proportion of an oxide selected form silica, titanium oxide or zirconium oxide. The use of such an oxidation catalyst allows operating at high temperatures, that can reach in particular 700° C., thus preventing the recycling operation of a part of the effluent from the oxidation stage, after its cooling, destined to ensure the temperature control in the oxidation stage, and thus eliminating the restrictions of such a recycling.

Said process suffers however from the drawback that the oxidation catalyst cannot be used at temperatures higher than 700° C., that is to say at temperatures which would be closer to the temperatures selected for the thermal oxidation stage in the known sulphur plants and accordingly would lead to increasing the sulphur yield of the catalytic oxidation stage.

SUMMARY OF THE INVENTION

The invention deals with a catalytic process for the production of sulphur from a gas containing $H_2S$, of a type similar to the process of the hereinabove mentioned French patent application, but in which a particular oxidation catalyst is used which has an increased resistance at high temperatures and accordingly allows carrying out the catalytic oxidation step at temperatures that can reach up to about 1000° C., this resulting in increasing the yield of the sulphur produced during said oxidation step.

DETAILED DESCRIPTION OF THE INVENTION

The process according to the invention for the production of sulphur from a gas, known as "acid gas", containing $H_2S$ comprises contacting the acid gas, at high temperature and in the presence of a $H_2S$-oxidation catalyst, with a determined quantity of a gas containing free oxygen in order to form a gaseous effluent containing $H_2S$ and $SO_2$ in a $H_2S/SO_2$ molar ratio substantially equal to 2/1 as well as a given proportion of sulphur, and then contacting said gaseous effluent, after cooling and possible separation of the sulphur contained therein, with a CLAUS catalyst to form a further quantity of sulphur, and is characterized in that said $H_2S$ oxidation catalyst consists of agglomerates with a surface area of at least 5 $m^2/g$ comprising an active alumina containing as a thermal stabilizer from 0.5 to 20% and preferably 1 to 10% by weight of the alumina, of at least one oxide selected from the group consisting of silica, zirconium oxide, the oxides of the rare-earth metals, more particularly the oxides of lanthanum, neodymium, praseodymium and thorium, and the oxides of the alkaline-earth metals, more particularly the oxides of barium, calcium, strontium and magnesium, to which are associated one or more compounds of metals selected from the group A consisting of Fe, Cu, Zn, Ag, Cd, Cr, Mo, W, Co, Ni and Bi, and optionally one or more compounds of metals selected from the group B consisting of Pd, Pt, Ir and Rh.

The agglomerates comprising active alumina thermally stabilized by at least one of the oxides defined above, which form the carrier of the oxidation catalyst, have as previously indicated a surface area, determined according to the BET method, of at least 5 m$^2$/g. More particularly said surface area is of at least 40 m$^2$/g and preferably ranges between 60 and 200 m$^2$/g.

The metal compounds that are associated to the carrier comprising stabilized alumina as previously disclosed are especially oxides or salts of mineral or organic acids such as sulphates, nitrates, phosphates, acetates.

The overall quantity of the compound or compounds of metals that are associated to the carrier, can represent, expressed by weight of metal, from 0.5 to 15% and preferably from 2 to 12% by weight of the calcinated catalyst.

When there are simultaneously associated to the carrier one or several compounds of metals selected in group A and one or several compounds of metals selected in group B, the ratio of the total number of atoms of group A metals to the total number of atoms of group B metals is between 20 and 1000 and preferably between 50 and 400.

Most suitable oxidation catalysts according to the invention, that enable operating at temperatures that can reach 1000° C. without any substantial decrease of their activity, consist of agglomerates comprising an active alumina containing as a thermal stabilizer from 0.5 to 20% and preferably from 1 to 10% by weight of the alumina, of at least one oxide selected from the group consisting of silica, zirconium oxide, the oxides of the rare-earth metals, more particularly the oxides of lanthanium, neodymium, praseodymium and thorium, and the oxides of the alkaline-earth metals, more particularly the oxides of barium, calcium, strontium and magnesium, to which is associated an iron compound and especially iron sulphate, said agglomerates having a surface area of at least 5 m$^2$/g, more particularly of at least 40 m$^2$/g and preferably from 60 to 200 m$^2$/g.

The agglomerates comprising active alumina thermally stabilized by at least one of the previously cited oxides, are obtained by submitting to calcination, at temperatures that can reach up to 1200° C., agglomerates of an active alumina that has been previously submitted to autoclaving, preferably in the presence of a mineral or organic acid, and contains, by weight of the alumina, from 0.5 to 20%, and preferably from 1 to 10%, of at least one oxide selected from the group consisting of silica, zirconium oxide, the oxides of the rare-earth metals, more particularly the oxides of lanthanum, neodymium, praseodymium and thorium, and the oxides of the alkaline-earth metals, more particularly the oxides of barium, calcium, strontium and magnesium, or of a corresponding amount of a precursor of said oxide, in particular a nitrate or chloride for the metal oxides or an alkyl silicate such as ethyl silicate for silica.

The product submitted to calcination can be obtained in different ways. In particular use can be made of any of the following methods:

adding the stabilizing oxide or oxides or a precursor thereof by mixing or impregnation to an aluminium hydroxide, then activating by dehydration the hydroxide containing the stabilizing compound or compounds, agglomerating the activated hydroxide and at last autoclaving the agglomerates thus obtained.

incorporating the stabilizing oxide or oxides or a precursor thereof to a powder of an active alumina prepared by dehydration of aluminium hydroxide, then agglomerating the powder containing the stabilizing compound or compounds, and at last autoclaving the agglomerates thus obtained.

impregnating agglomerates of an active alumina powder by means of a precursor or precursors of the stabilizing oxide or oxides, and then autoclaving the impregnated agglomerates thus obtained.

autoclaving agglomerates of active alumina and if necessary reactivating the autoclaved agglomerates, and then impregnating the thus treated agglomerates with a precursor or precursors of the stabilizing oxide or oxides.

treating agglomerates of active alumina in a liquid medium containing a mineral or organic acid, that can dissolve part of the alumina from the agglomerates, and one or more precursors of the stabilizing oxides, said precursors having an anion capable of combining with the aluminium ions put into solution, and then autoclaving at temperatures between 80° C. and 250° C. the agglomerates resulting from said treatment.

precipitating a cohydrogel containing alumina and one or more of the stabilizing oxides from aluminium salt solutions containing one or more precursors of said oxides, then activating the cohydrogel in a stream of hot gases, and at last agglomerating the activated cohydrogel particles thus produced.

The active alumina that is used together with the previously cited oxides or oxide precursors to form the product to be submitted to calcination, can be obtained by any method known in the art and in particular by performing a quick dehydration of aluminium hydroxides such as hydrargillite, bayerite, norstrandite, or aluminium oxihydroxides such as boehmite or diaspore, said dehydratation being preferably carried out in a stream of hot gases.

More details in connection with the preparation of the agglomerates comprising active alumina thermally stabilized by at least one of the previously cited stabilizing oxides can be found in French patent application No. 80 27299 (publication No. 2,496,631) and in U.S patent No. 4,061,594.

The oxidation catalyst can be obtained by impregnation of agglomerates of thermally stabilized active alumina with the selected metal compound (s), then drying of the impregnated agglomerates and at last calcination of the dried agglomerates at high temperatures, for instance between 300° C. and 1000° C. The oxidation catalyst can also be obtained by associating the selected metal compound (s) with the agglomerates of thermally stabilized active alumina during the preparation of said agglomerates according to any of the methods briefly disclosed above.

The acid gas, i.e. the gas containing H$_2$S, that is treated in order to form sulphur by the process according to the invention, can be of various origins. Especially, such an acid gas can be a natural gas or also a gas issuing from the gasification of coal or heavy oils. The process according to the invention applies particularly to the treatment of acid gases containing less than 25% and preferably from 0.5 to 20% H$_2$S by volume. Acid gases containing a higher H$_2$S content can also be treated by this process although in this case is preferably used the standard process of sulphur production, comprising a thermal reaction. The acid gas can also contain inorganic sulphur compounds such as mercaptans, COS, CS$_2$ having an overall concentration that can be present in a quantity up to 1% by volume.

The gas containing the free oxygen used for the oxidation of H$_2$S of the acid gas is generally air, although it is possible to use pure oxygen, oxygen-enriched air, or mixtures, in variable proportions, of an inert gas other than nitrogen and oxygen. The acid gas and the gas containing free oxygen can be brought separately into contact with the oxidation catalyst.

However, with the aim of obtaining a very homogenous gaseous reaction medium, it is preferable to premix the said acid gas with the gas containing free oxygen and to cause the thus produced mixture to flow in contact with the oxidation catalyst. The gas containing free oxygen is used in a quantity controlled so that there is a quantity of oxygen corresponding to that necessary to partially oxidize H$_2$S into SO$_2$ so as to form an effluent containing H$_2$S and SO$_2$ in a H$_2$S/SO$_2$ molar ratio equal to 2/1 as well as a given quantity of sulphur and a practically negligible residual oxygen content.

The control of the quantity of gas containing free oxygen is achieved in a manner known per se, through determination of the value of the H$_2$S/SO$_2$ molar ratio or the oxygen content in the oxidation effluent and causing to vary the flow of the gas containing free oxygen used for oxidation in response to a control value obtained from the compilation of the results of these determinations, so as to maintain the said H$_2$S/SO$_2$ molar ratio at a value of 2/1 or the said oxygen content below a fixed value.

Contact time of the gaseous reaction mixture with the oxidation catalyst can range from 0.5 to 10 seconds, these values being given in standard pressure and temperature conditions.

As indicated herein-above, the partial oxidation of H$_2$S of the acid gas by oxygen of the gas containing free oxygen is achieved at high temperature, i.e. according to the invention at a temperature comprised between 200° and 1000° C. and preferably located between 200° and 900° C. In order to establish a suitable oxidation temperature comprised in this range, the gaseous mixture of the acid gas and the gas containing free oxygen or each of the said gases, when they are brought separately into contact with the oxidation catalyst, is subjected to a preheating at a temperature comprised between 180° C. and 250° C. and higher in this range when the H$_2$S content of the acid gas is low.

The effluent of the oxidation of the acid gas contains sulphur vapor as well as H$_2$S and SO$_2$ in a H$_2$S/SO$_2$ molar ratio equal to 2/1. This effluent is subjected to cooling, and the cooled effluent, possibly freed of sulphur that it contains, is caused to contact a CLAUS catalyst in order to achieve the H$_2$S and SO$_2$ reaction and to form a further quantity of sulphur.

When the H$_2$S content of the effluent of the oxidation is lower than 2% by volume, the contacting of the said effluent with the CLAUS catalyst is achieved at a temperature lower than the dew point of the sulphur contained in the said effluent, this temperature being advantageously comprised between 80° C. and 160° C., and the sulphur formed by the reaction of H$_2$S and SO$_2$ is deposited on the catalyst.

Periodically, the sulphur loaded CLAUS catalyst is regenerated by sweeping of the said catalyst with a gas devoid of free oxygen and at a temperature comprised between 200° and 400° C. In a preferred embodiment of such an application, this CLAUS reaction is carried out in a series of catalytic converters, which operate in such a way that at least one of the said converters is in a regeneration phase whereas the others are in a CLAUS reaction phase, and the effluent of the oxidation zone is caused to flow firstly in the converter(s) of the regeneration phase the said effluent acting as a regeneration gas and then, after condensation of the sulphur, in the converter(s) of the CLAUS reaction phase.

When the H$_2$S content of the oxidation effluent is equal to or above 2% by volume, the contacting of the said effluent, possibly free of sulphur that it contains, with the CLAUS catalyst is achieved, at temperatures higher than the dew point of the sulphur contained in the effluent, these temperatures being generally comprised between 200° and 450° C. in a single catalytic converter or in several of such converters mounted in series as in the case of a standard sulphur plant. If it is necessary to perfect the recovery of the sulphur contained in the form of H$_2$S and SO$_2$ in the effluent, the contacting of the effluent with the CLAUS catalyst above the dew point of the sulphur contained in the effluent can be followed by a contacting at a temperature lower than the dew point of sulphur as indicated herein-above.

The CLAUS catalyst, with which the oxidation effluent is contacted in one or several catalytic converters as indicated herein-above, can be any one of the catalysts normally used to promote the formation of sulphur by reaction between H$_2$S and SO$_2$. The most suitable products are aluminas, bauxite, titanium or zirconium oxides, silicas, natural or synthetic zeolites, and mixtures of such products.

According to the invention, it is particularly advantageous that the oxidation effluent contacts with a desoxygenation catalyst such as described in French Pat. No. 75 31769 (Publication No. 2.327.960) before contacting the CLAUS catalyst. Such a desoxygenation catalyst can promote the CLAUS reaction between H$_2$S and SO$_2$ of formation of sulphur and among others it ensures complete elimination of residual oxygen possibly present in the oxidation effluent.

When the CLAUS reaction is applied at a temperature lower than the dew point of sulphur contained in the oxidation effluent, the desoxygenation catalyst is contained in a desoxygenation reactor placed upstream of the series of catalytic converters of which some operate as regenerator and others as CLAUS reactors.

When the CLAUS reaction is applied at a temperature higher than the dew point of the sulphur contained in the oxidation effluent, the desoxygenation catalyst can constitue only one attack layer or indeed the totality of the single catalytic converter or of the first converter of several catalytic converters mounted in series.

As in a standard sulphur plant, the gases issuing from the contacting of the oxidation effluent with the CLAUS catalyst are subjected to a thermal or catalytic incineration in order to transform into SO$_2$ all the sulphur compounds that they still contain in very small quantities, and the waste gases resulting from the incineration are discarded into the atmosphere.

The following examples are given by way of non-limitative illustration of the invention.

EXAMPLE 1

Operation occurs in a pilot installation comprising the following elements:

an oxidation reactor with a fixed bed containing 600 kg of an oxidation catalyst according to the invention, the said reactor being equipped with a feed pipe for the mixture of acid gas and air and a evacuation pipe for the oxidation effluent;

an indirect gas/gas heat exchanger of which one of the exchange circuits is mounted in series on the feed pipe of the mixture of acid gas and air and the other exchange circuit is mounted -in series with the evacuation pipe of the oxidation effluent;

a primary catalytic converter having a fixed bed, that contains 1200 kg of a CLAUS catalyst in the form of extrudates of 3 mm diameter consisting of titanium oxide containing 10% by weight of calcium sulphate and of which the entry is connected to the evacuation pipe of the oxidation effluent through the appropriate exchange circuit of the heat exchanger;

a catalytic conversion battery comprising two secondary catalytic converters and a sulphur condenser cooled by steam, in which, on the one hand, each of the said converters contains 1800 kg of a CLAUS catalyst consisting of an activated alumina in the form of beads of 4 to 6 mm diameter and, on the other hand, the secondary converters and the sulphur condenser are positioned in such a way that the exit of the primary converter is alternatively connected to the entry of the other said secondary converters(s), the latter being associated in series through the sulphur condenser; and a catalytic incinerator of which the inlet is connected to the exit of the catalytic converter battery and the outlet to the stack open to the atmosphere.

As the oxidation catalyst a catalyst was used consisting of beads, of 4 to 6 mm diameter, of an active alumina thermally stabilized by 2% by weight of a mixture of lanthanum oxide and neodymium oxide in a lanthanum to neodymium atomic ratio equal to 1:1 and having a surface area equal to 90 $m^2/g$, said alumina being impregnated with iron sulphate. The catalyst contained 5% by weight of iron with respect to the calcinated catalyst weight.

The oxidation catalyst was obtained as follows:

Active alumina beads were prepared using a method similar to that disclosed in example 1 of French patent application No. 80 27299. The active alumina beads thus obtained were then dry impregnated with an aqueous solution of lanthanum nitrate and neodymium nitrate in equimolar amounts, said solution having an overall nitrate concentration equal to 0.12 mole per liter and being used at the rate of 1 liter per kilog of alumina beads. The beads impregnated with the lanthanum and neodymium nitrates were then dried at about 110° C. and thereafter calcinated at 700° C. for 1 hour to give the thermally stabilized beads. Said beads were then impregnated with an aqueous solution of iron sulphate containing 1 mole sulphate per liter, said solution being used at a rate of 1 liter per kilog of stabilized beads. The stabilized beads impregnated with iron sulphate were dried at 105° C. and then calcinated at 450° C. to give the oxidation catalyst referred to above containing 5% by weight of iron.

The acid gas to be treated issued from the gaseification of coal and had the following composition by volume:

| | |
|---|---|
| $H_2S$ | 12% |
| $CO_2$ | 81% |
| $H_2O$ | 7% |

To this acid gas, which arrives at a flow-rate of 1000 $m^3/h$, are added 285.6 $m^3$/hour air, and the gaseous mixture obtained was preheated at a temperature of 200° C., through passage in the heat exchanger, then injected in the oxidation reactor. Contact time between the gaseous mixture and the oxidation catalyst were equal to 2 seconds (standard conditions) and the temperature within the catalytic bed rose to 480° C.

The effluent of the oxidation reactor contained $H_2S$ and $SO_2$ in a $H_2S/SO_2$ molar ratio equal to 2/1, as well as 10 v.p.m. free oxygen and a quantity of sulphur vapour corresponding to a conversion rate of $H_2S$ to sulphur of 59%.

This effluent, whose temperature was equal to 480° C., passed into the heat exchanger, where a part of the calories of the effluent were used to pre-heat the acid gas and air mixture whereby said effluent was cooled to 150° C. The cooled effluent was reheated to 250° C. and fed to the primary CLAUS catalytic converter. In said primary catalytic converter the contact time between the catalyst comprising titanium dioxide and the cooled effluent was equal to about 3 seconds and the temperature within the catalytic bed amounted 300° C.

The reaction mixture containing $H_2S$, $SO_2$ and sulphur vapour, issued from the primary CLAUS converter was caused to flow through the secondary converter in the "regeneration" phase of the catalytic conversion battery in order to achieve a sweeping of the catalyst loaded with sulphur contained in this converter, the said sweeping being carried out at a temperature of about 300° C. with a gas/catalyst contact time of about 6 seconds. The gas loaded with sulphur issuing from the secondary converter submitted to regeneration, thus passes through the sulphur condenser cooled by steam, in which the said gas is cooled to a temperature of about 150° C. and freed of sulphur contained therein by condensation. The resulting cooled gas, that contains $H_2S$ and $SO_2$ as well as a very small quantity of sulphur vapour was caused to flow into the secondary catalytic converter in the "CLAUS reaction" phase of the catalytic conversion battery operating at a temperature of 150° C., with a gas/catalyst contact time of about 6 seconds, in order to form sulphur by reaction between $H_2S$ and $SO_2$, the said sulphur being deposited on the catalyst.

The residual gases escaping from the secondary converter in the CLAUS reaction phase, were caused to flow to the catalytic incineration step and the fumes resulting from the incineration, that contained a small concentration of $SO_2$ as the unique sulphur compound, were discarded into the atmosphere through the stack.

The residual gases exiting from the catalytic conversion battery only contained 1350 v.p.m. total sulphur, namely $H_2S$, $SO_2$, sulphur vapour and/or vesicular sulphur, that corresponds to a total conversion yield of $H_2S$ into sulphur equal to 98.9%.

After 800 hours working under the operating conditions as defined above, the effluent exiting from the oxidation reactor contained $H_2S$ and $SO_2$ in a $H_2S$ to $SO_2$ molar ratio of 1.98:1 and a quantity of sulphur vapour corresponding to a conversion rate of $H_2S$ to sulphur equal to 56%, the total conversion yield of $H_2S$ to sulphur being equal to 98.6%.

EXAMPLE 2

Operation occurs in an installation similar to that used in Example 1, in which is treated an acid gas having the following composition by volume:

| | |
|---|---|
| $H_2S$ | 20% |
| $CH_4$ | 0.14% |
| CO | 0.33% |

| | |
|---|---|
| H$_2$ | 0.19% |
| H$_2$O | 7% |
| CO$_2$ | 72.34% |

An oxidation catalyst was used consisting of beads, of 4 to 5 mm diameter, of an active alumina thermally stabilized by 3% by weight of barium oxide and having a surface area equal to 85 m$^2$/g, said alumina being impregnated with a quantity of iron sulphate corresponding to 4.3% by weight iron with respect to the weight of the calcinated catalyst.

The oxidation catalyst was prepared using a method similar to that disclosed in example 1 but for replacing the solution of lanthanum and neodymium nitrates by an aqueous solution of barium nitrate having a barium nitrate concentration of 0.196 mole per liter and further using 0.8 liter of the iron sulphate solution per kilog of stabilized beads.

To 1000 m$^3$/hour acid gas were added 495 m$^3$/hour air and the resulting mixture was preheated to 200° C. prior to its injection in the oxidation reactor. The other operating conditions corresponded to those used in Example 1.

The effluent issuing from the oxidation reactor contained H$_2$S and SO$_2$ in a H$_2$S to SO$_2$ molar ratio equal to 2:1, as well as 7 v.p.m. free oxygen and a quantity of sulphur vapour corresponding to a conversion rate of H$_2$S to sulphur equal to 58%. This effluent, the temperature of which was equal to 800° C., was free from CO and hydrogen.

Further the residual gases exiting from the catalytic conversion battery only contained 1000 v.p.m. total sulphur, that corresponds to a total conversion yield of H$_2$S into sulphur equal to 99.5%.

After 650 hours working under the operating conditions as defined above, the effluent issuing from the catalytic oxidation reactor contained H$_2$S and SO$_2$ in a H$_2$S to SO$_2$ molar ratio equal to 2.03 and a quantity of sulphur vapour corresponding to a conversion rate of H$_2$S to sulphur equal to 54%, the total conversion yield of H$_2$S to sulphur being equal to 99.1%.

EXAMPLE 3

In an installation similar to that used in Example 1, a series of tests were carried out, in which is treated an acid gas having the following composition by volume:

| | |
|---|---|
| H$_2$S | 18% |
| CO$_2$ | 75% |
| H$_2$O | 7% |

The oxidation catalysts used for these tests were different from test to test and prepared as indicated hereafter from active alumina beads of 4 to 5 mm diameter obtained as disclosed in Example 1 of French patent application No. 80 27299.

Test I

The alumina beads were impregnated with an alcoholic solution of ethyl silicate, then dried and thereafter calcinated at 500° C. under an inert atmosphere. The ethyl silicate solution was used in an amount sufficient to obtain 2.2.% by weight of silica in the beads after calcination at 500° C. The calcinated beads were then impregnated with an aqueous solution of copper and silver nitrates so as to obtain, after drying and calcination at 800° C., an oxidation catalyst containing, by weight, 2% SiO$_2$, 2% CuO and 3% Ag$_2$O. The surface area of said oxidation catalyst was equal to 137 m$^2$/g.

Test II

The active alumina carrier in the form of beads was impregnated with a zirconium oxychloride solution so as to obtain, after drying and then calcination at 800° C., a product containing 4.2% by weight ZrO$_2$. The calcinated product was then impregnated with chromic acid so as to obtain, after drying and calcination at 800° C., an oxidation catalyst containing, by weight, 4% ZrO$_2$ and 5% Cr$_2$O$_3$. The surface area of the oxidation catalyst thus obtained was equal to 99 m$^2$/g.

Test III

The active alumina carrier in the form of beads was impregnated with a lanthanum nitrate solution so as to obtain, after drying and calcination at 700° C., a product containing by weight 2.2.% La$_2$O$_3$. The calcinated product was then impregnated with metatungstic acid so as to obtain, after drying and calcination at 800° C., an oxidation catalyst containing by weight 2% La$_2$O$_3$ and 7% WO$_3$. The surface area of said oxidation catalyst was equal to 99 m$^2$/g.

Test IV

The preparation was carried out as disclosed in test III but for replacing the metatungstic acid by cobalt nitrate so as to obtain, after drying and calcination at 800° C., an oxidation catalyst containing by weight 2% La$_2$O$_3$ and 6% CoO. The surface area of said oxidation catalyst was equal to 101 m$^2$/g.

Test V

The preparation was performed as disclosed in test III but for replacing the metatungstic acid by nickel nitrate so as to obtain, after drying and calcination, an oxidation catalyst containing by weight 2% La$_2$O$_3$ and 8% NiO. The surface area of the oxidation catalyst was equal to 95 m$^2$/g.

Test VI

The preparation was performed as disclosed in test III but for replacing the metatungstic acid by a bismuth nitrate solution containing nitric acid so as to obtain, after drying and calcination at 800° C., an oxidation catalyst containing by weight, 2% La$_2$O$_3$ and 9% Bi$_2$O$_3$. The surface area of the oxidation catalyst was equal to 96 m$^2$/g.

Test VII

The preparation was performed as disclosed in test III but for replacing the metatungstic acid by cadmium chloride so as to obtain, after drying and calcination at 800° C., an oxidation catalyst containing by weight, 2% La$_2$O$_3$ and 7% CdO. The surface area of the oxidation catalyst was equal to 103 m$^2$/g.

To perform tests I to VII, 1000 m$^3$/hour acid gas were added to 446 m$^3$/hour air and the resulting mixture was preheated at 200° C. prior to its injection in the oxidation reactor, the other operating conditions corresponding to those used in Example 1.

In the Table hereafter are given, for the different oxidation catalysts used in the tests, the sulphur yield (RS) in the catalytic oxidation reactor and the H$_2$S to $SO_2$ molar ratio at the outlet of said reactor after respectively 10 hours and 100 hours working.

| Test number | Working duration | | | |
|---|---|---|---|---|
| | 10 hours | | 100 hours | |
| | RS (%) | $H_2S:SO_2$ | RS (%) | $H_2S:SO_2$ |
| I | 56 | 2:1 | 52 | 1,98:1 |
| II | 55 | 2:1 | 53 | 1,97:1 |
| III | 57 | 2:1 | 54 | 1,97:1 |
| IV | 56 | 2:1 | 53 | 1,96:1 |
| V | 56 | 2:1 | 52 | 1,97:1 |
| VI | 55 | 2:1 | 53 | 1,98:1 |
| VII | 55 | 2:1 | 52 | 1,97:1 |

Further for all the tests I to VII, the effluent exiting from the oxidation reactor had a temperture between 620° C. and 630° C. and the free-oxygen content of said effluent was not higher than 30 v.p.m. after 100 hours working. For all the tests the total conversion yield of $H_2S$ to sulphur was higher than 98.6% at the beginning of the operation and still higher than 98.2% after 100 hours working.

In the examples, the flow-rates of acid gas and air in $m^3$/hour are defined under standard pressure and temperature conditions.

I claim:

1. A catalytic process for production of sulphur from a gas, known as an "acid gas", containing $H_2S$, in which the acid gas is contacted, at a temperature between 200° and 1000° C. and in the presence of a $H_2S$-oxidation catalyst, with a controlled quantity of a gas containing free oxygen in order to form a gaseous effluent containing $H_2S$ and $SO_2$ in a $H_2S$ to $SO_2$ molar ratio substantially equal to 2:1 as well as sulphur, then said effluent, after cooling, is contacted with a CLAUS catalyst in order to form a further quantity of sulphur, wherein the $H_2S$-oxidation catalyst consists of agglomerates having a surface area of at least 5 $m^2$/g and comprising an active alumina and either:
   (a) containing silica as a thermal stabilizer in an amount from 0.5 to 20% by weight of the alumina, to which is associated a compound of iron; or
   (b) containing lanthanum oxide and neodymimium oxide as a thermal stabilizer in an amount from 0.5 to 20% by weight of the alumina, to which is associated a compound of iron.

2. A process according to claim 1, wherein the active alumina is thermally stabilized by a quantity of stabilizing oxide or oxides ranging from 1 to 10% by weight of the alumina.

3. A process according to claim 1, wherein the agglomerates of thermally stabilized active alumina have a surface area of at least 40 $m^2$/g.

4. A process according to claim 3, wherein said surface area is between 60 and 200 $m^2$/g.

5. A process according to claim 1, wherein the overall quantity of the metal compound(s) associated with the agglomerates of thermally stabilized active alumina ranges from 0.5 to 15% of the weight of the calcinated catalyst.

6. A process according to claim 5, wherein said overall quantity ranges from 2 to 12% of the weight of the calcinated catalyst.

7. A process according to claim 1, wherein said iron compound is iron sulphate.

8. A process according to claim 1, wherein the acid gas contains less than 25% $H_2S$ by volume.

9. A process according to claim 8, wherein the acid gas contains from 0.5 to 20% $H_2S$ by volume.

10. A process according to claim 1, wherein the acid gas contains less than 25% $H_2S$ by volume and one or more organic sulphur compounds in an amount of up to about 1% by volume.

11. A process according to claim 10, wherein said organic sulphur compounds are selected from the group consisting of mercaptans, COS and $CS_2$.

12. A process according to claim 10, wherein the acid gas contains from 0.5 to 20% $H_2S$ by volume.

13. A process according to claim 1, wherein the oxidation of $H_2S$ in the acid gas is achieved at a temperature between 200° C. and 900° C.

14. A process according to claim 1, wherein the oxidation effluent has a $H_2S$ content lower than 2% by volume, and the contacting of said effluent with the CLAUS catalyst is achieved at a temperature lower than the dew point of sulphur contained in the effluent, said temperature being between 80° C. and 160° C., and the CLAUS catalyst that is loaded with the sulphur that has been formed is periodically regenerated by sweeping with a gas devoid of free oxygen and at a temperature between 200° C. and 400° C.

15. A process according to claim 14, wherein said contacting with the CLAUS catalyst is achieved in a series of catalyst converters, that operate in such a way that at least one of said converters is in the regeneration phase whereas the others are in the CLAUS reaction phase, and the effluent from the oxidation zone is caused to pass, first of all, into the or each converter which is in the regeneration phase, in order to ensure sweeping of the sulphur loaded catalyst contained therein, then after separation of the sulphur, into the or each CLAUS reaction phase converter.

16. A process according to claim 1 wherein the oxidation effluent has a $H_2S$ content equal to or higher than 2% by volume and the contacting of said effluent with the CLAUS catalyst is carried out at a temperature higher than the dew point of sulphur contained in the effluent through operating in a single catalytic converter or in several of such converters arranged in series.

17. A process according to claim 16, wherein said contacting is carried out at temperatures between 200° C. and 450° C.

18. A process according to claim 16, wherein the contacting of the oxidation effluent with the CLAUS catalyst at a temperature higher than the dew point of sulphur contained in the oxidation effluent is followed by a contacting with a CLAUS catalyst at a temperature below said dew point of sulphur.

19. A process according to claims 14 or 16, wherein the oxidation effluent is contacted with a desoxygenation catalyst before contacting the CLAUS catalyst.

20. A process according to claim 1 or 14 or 16, wherein the gases issuing from the contacting of the oxidation effluent with the CLAUS catalyst are subjected to a thermal or catalytic incineration.

21. A process according to claim 1, wherein lanthanum oxide and neodymium oxide are used for thermally stabilizing the active alumina.

* * * * *